United States Patent [19]
Yelton

[11] Patent Number: 5,207,551
[45] Date of Patent: May 4, 1993

[54] REMOVABLE CONVEYOR BELT ASSEMBLY WITH ADJUSTABLE BARRIERS FOR CONCRETE TRUCKS

[76] Inventor: James E. Yelton, P.O. Box 5613, Eugene, Oreg. 97405

[21] Appl. No.: 760,183

[22] Filed: Sep. 16, 1991

[51] Int. Cl.⁵ .............................................. B60P 1/38
[52] U.S. Cl. ................................... 414/528; 414/523; 198/836.1; 198/525
[58] Field of Search ................ 414/528, 527, 523; 198/823, 525, 836.1

[56] References Cited

U.S. PATENT DOCUMENTS

| | | | |
|---|---|---|---|
| 1,928,859 | 10/1933 | Kutscha | 414/528 X |
| 2,563,418 | 8/1951 | Peter et al. | 414/528 X |
| 2,883,035 | 4/1959 | Erisman | 198/525 X |
| 3,024,893 | 3/1962 | Lambert | 198/836.1 |
| 3,036,691 | 5/1962 | Byrnes | 198/525 X |
| 3,090,515 | 5/1963 | Crowther | 414/528 X |
| 4,253,612 | 3/1981 | Schulze | 414/523 X |

FOREIGN PATENT DOCUMENTS

| | | | |
|---|---|---|---|
| 2416963 | 10/1975 | Fed. Rep. of Germany | 198/525 |
| 1025599 | 6/1983 | U.S.S.R. | 198/823 |

Primary Examiner—Frank E. Werner
Attorney, Agent, or Firm—James D. Givnan, Jr.

[57] ABSTRACT

This invention relates to a conveyor assembly on a truck for transporting and mixing concrete components. The conveyor assembly is secured in place by guides permitting lineal removal of the conveyor assembly A conveyor belt is supported by rollers which are carried in pairs of recessed blocks for easy removal. The margins of the belt are in contact with barriers extending lengthwise along the conveyor which confine the concrete components on the belt. Barrier supports are of the over center clamping type to facilitate barrier adjustment.

2 Claims, 1 Drawing Sheet

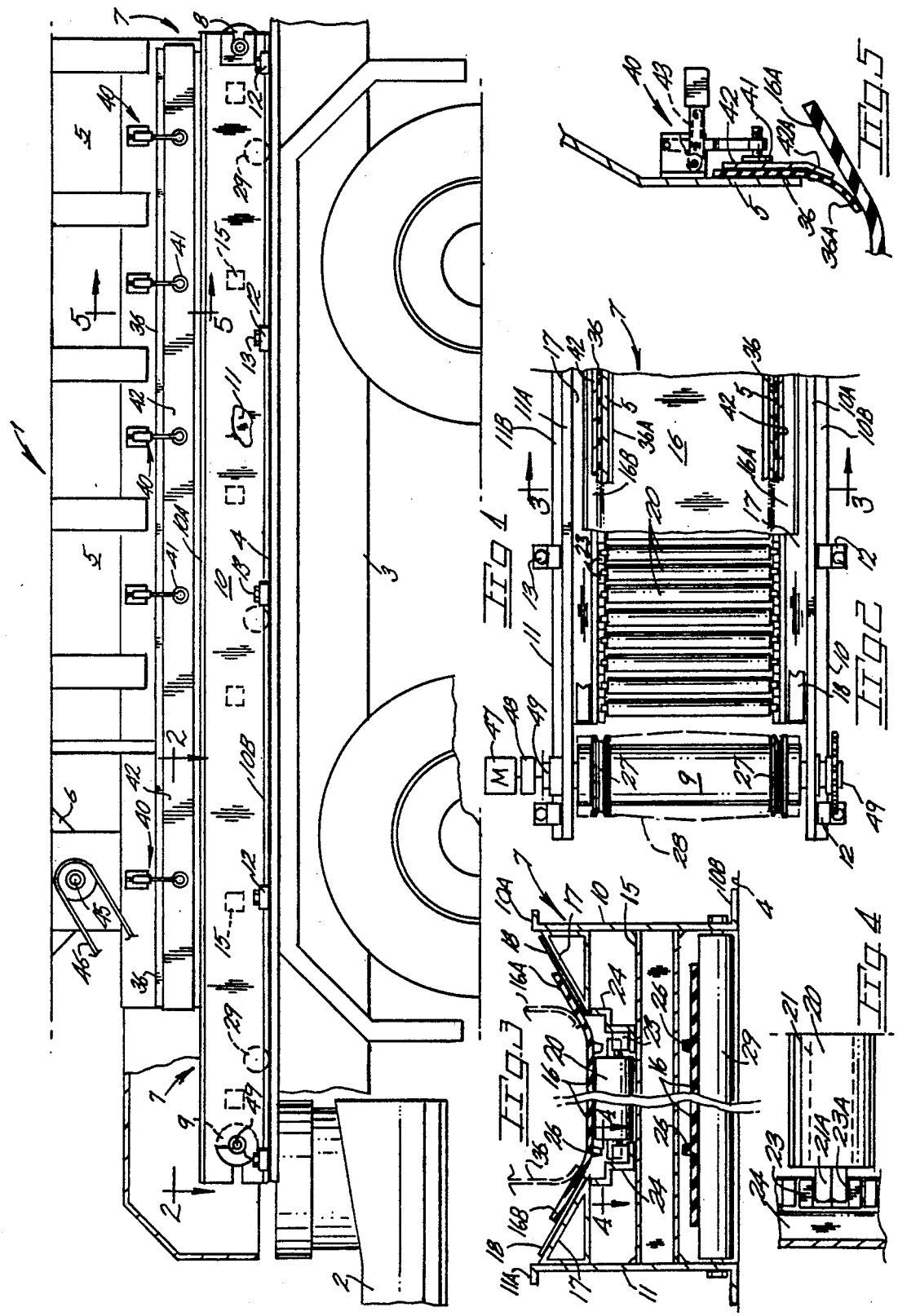

REMOVABLE CONVEYOR BELT ASSEMBLY WITH ADJUSTABLE BARRIERS FOR CONCRETE TRUCKS

BACKGROUND OF THE INVENTION

The present invention pertains generally to conveyors used in batch type concrete trucks which transport sand and gravel in a dry state and mix same with water at the delivery site.

In wide use today are trucks of the above noted type which utilize a conveyor belt to deliver selected quantities of sand, gravel and cement to a truck mounted delivery chute wherein the concrete is mixed by an auger which additionally serves to discharge the material in a precise manner at the site. The general type of truck in which the present conveyor invention is useable is disclosed in U.S. Pat. No. 3,310,293. An endless conveyor belt travels below discharge chutes of the sand, gravel and cement bins and delivers a preselected mixture of same into the positionable chute or trough for discharge.

As noted in my earlier U.S. Pat. No. 4,422,767 such conveyor belts are, by reason of the abrasive nature of the material conveyed, subject to a high rate of wear and considerable maintenance. Existing conveyor belt assemblies in concrete batch trucks are accessible for periodic servicing only after considerable time is spent removing adjacent components of the truck. The refurbishing of an existing prior art conveyor is costly both from a parts and time standpoint with considerable effort expended in the reinstallation of the conveyor assembly onto the truck chassis. As noted above the highly abrasive nature of the materials handled contributes greatly to the problem.

SUMMARY OF THE PRESENT INVENTION

The present invention is embodied in a conveyor assembly for detachable installation on a truck for the handling of highly abrasive materials.

Rails of the conveyor assembly are retained within guides on the truck chassis to facilitate extraction of the conveyor assembly and reinstallation in a unitary manner with minimum disturbance or removal of adjacent truck components. The conveyor assembly, after removal from the truck may be readily refurbished by reason of belt supporting rollers being supported in recessed mounting blocks Roller replacement is accomplished by the lifting of a damaged or worn roller and the "drop in" replacement of a new roller unit. Roller shaft ends fit within mounting blocks of corresponding shape. Belt tracking is maintained on head and tail rolls with at least one belt rib in place on the inner side of the endless belt with the head and tail rolls grooved to receive the rib. The side margin of the conveyor belt are supported on transversely inclined members of the conveyor frame while the conveyed material is confined toward a medial area of the belt by flexible barriers lengthwise disposed, in an adjustable manner, along the belt side margins. Supports for the flexible barriers utilize quick release type clamping components to permit periodic adjustment of the barriers to assure an effective barrier against the escape of granular material onto metal conveyor members. Such supports for the flexible barriers permit the rapid replacement of the barriers when worn after a period of use with the barriers being low cost, flexible strips of stock material. Further adjustment is in an infinite manner to assure desired, lightly biased contact with the conveyor belt margins for purposes of confining granular material on the belt surface with minimum belt and barrier wear.

Important objectives of the present conveyor belt assembly include the provision of a truck mounted conveyor which is readily detached and removed from guides on the truck body for periodic inspection and repair purposes; the provision of a conveyor assembly mounted in place on guides to permit removal and replacement in a linear manner with minimum interference with other truck components; the provision of an endless belt conveyor using a series of rollers each of which is in rested engagement in recessed mounting blocks to permit lift out and the dropping in of a new roller unit; the provision of flexible barriers having their lower extremities in sliding contact with inclined margins of the conveyor belt and with quick release barrier support means permitting infinite adjustment of the barrier for optimum contact with the conveyor belt; the provision of barrier supports that utilize low cost stock material with replacement achieved in a convenient manner by the use of over center clamps.

BRIEF DESCRIPTION OF THE DRAWING

In the accompanying drawing:

FIG. 1 is a fragmentary side elevational view of a batch type concrete truck;

FIG. 2 is a horizontal fragmentary view of the present conveyor assembly taken along line 2—2 of FIG. 1;

FIG. 3 is a vertical sectional view taken along line 3—3 of FIG. 2;

FIG. 4 is a horizontal fragmentary view taken along line 4—4 of FIG. 3, and

FIG. 5 is a vertical sectional view taken along line 5—5 of FIG. 1.

DETAILED DESCRIPTION OF THE PREFERRED EMBODIMENTS

With continuing attention to the drawings wherein applied reference numerals indicate parts similarly hereinafter identified, the reference numeral 1 indicates generally the rearward portion of a truck capable of delivering sand, gravel, cement and water to a using site whereat the material is mixed and discharged by means of a truck mounted chute at 2 equipped with an auger.

With continuing regard to trucks delivering batches of concrete ingredients for mixing at a site, a frame or chassis is indicated at 3 supported by rear dual wheels. On the truck chassis is a body 5 constituting sand and gravel bins. A cement bin is at 6. Also on frame 3 is a bed 4 which serves to support the following described conveyor assembly.

The conveyor assembly, indicated generally at 7, includes head and tail rolls at 8 and 9 each adjacent the ends of parallel conveyor rails at 10 and 11 which are flanged at their top and bottom edges as at 10A -10B and 11A–11B. The lowermost rail flanges 10B and 11B rest in place on bed 4 of the truck chassis as do guides as at 12 with guide fasteners 13 which serve to clamp the guides 12 into locking engagement with the lower flanges 10B–11B of the conveyor rails. Spacer tubes at 15 join the conveyor rails in parallel relationship.

An endless conveyor belt 16 is supported along its margins 16A and 16B by transversely inclined support structures a 17 affixed to the inner or opposed surfaces of the rails. Friction reducing strips at 18 (FIG. 3) are in place on each of the inclined surfaces. Backing off of fasteners 13 permits sliding of the conveyor off of bed 4.

Rollers at 20 of the conveyor serve to support the upper run of belt 16 with each roller journalled on a roller shaft at 21 with ends at 21A extending beyond the roller ends for placement in recesses 23A formed in roller mounts 23. Each recess 23A is provided with flats for cooperation with flats on the shaft ends 21A to fixedly retain the shaft in place. The roller mounts 23 are secured in place along parallel angular supports 24 extending lengthwise of the conveyor rails with the mounts 23 being secured to the supports as by welds. Accordingly upon removal of belt 16 from in place on the rollers 20 the rollers may be lifted free for repair or replacement. The spacer tubes 15 carry the supports 24.

As best shown in FIG. 3, the innerside of belt 16 is provided with lengthwise extending ribs 26 which are entrained about sheaves as at 27 welded to the head and tail rolls. Further, the head and tail rolls each receive an elastomeric, crowned sleeve as at 28. Accordingly the belt is entrained on the head and tail rolls in a manner preventing lateral displacement of the belt. The lower or return run of belt 16 is supported by spaced apart bottom rollers 29 in place on the conveyor rails.

For confining granular material on the upper run of conveyor belt 16, flexible barrier means are provided including flexible elastomeric strips 36 each terminating downwardly in an edge 36A in sliding contact with belt 16 and specifically with upwardly inclined margins thereof at 16A and 16B carried on inclined supports 17 of the conveyor frame. Accordingly, material deposited on the belt and conveyed is virtually entirely supported by that portion of the belt in place o rollers 20. The granular material carried by the belt, e.g., sand, gravel, cement, is thus confined against passage over the belt sides.

Indicated generally at 40 in FIG. 5 are barrier support means utilizing a clamping member 41 which bears against a plate 42 which, in turn, bears against barrier strips 36 to clamp same against the wall structure 5 in an adjustable manner. Utilizing an overcenter locking arrangement, as at 43, allows the several clamping members 41 to be quickly released to enable vertical adjustment of barrier strip 36 to achieve desired contact of barrier segment 36A with belt margins 16A-16B. Plate 42 has a lower edge 42A inclined somewhat to direct barrier portion 36A inwardly.

During conveyor use a rotary vane feeder shaft 45 in cement bin 6 is driven off of tail roll 9 by means of a chain and sprocket drive at 46. A hydraulic motor at 47 on the truck drives conveyor tail roll 9 via a coupling 48 which is disengageable from a roll carrying shaft 49 to permit removal of the conveyor for servicing purposes.

While I have shown but one embodiment of the invention, it will be apparent to those skilled in the art that the invention may be embodied still otherwise without departing from the spirit and scope of the invention.

Having thus described the invention, what is claimed and desired to be secured by a Letters Patent is:

1. In combination,
   a truck chassis including multiple bins for carrying sand, gravel and cement,
   an endless belt conveyor assembly for removable installation on the chassis below the bins for conveying discharged material from the bins during unloading of the truck, said conveyor assembly comprising:
   rail members having a head roll and a tail roll, a motor coupled to said tail roll,
   spacer tubes joining said rail members at spaced intervals,
   guide means attaching said rail members to the truck chassis in a manner permitting removal of the rail members from the truck chassis in a lengthwise direction,
   a series of upper rollers and on said rail members intermediate the head roll and the tail roll, each of said upper rollers including a shaft, lower rollers on said rail members,
   roller mounts on each of said rail members each having a series of recesses to receive the shaft of each of said upper rollers, said roller mounts supported by said spacer tubes, an endless belt on said head roll and said tail roll and having side margins and an upper run partially supported by said upper rollers,
   an inclined surface extending lengthwise along each of said rail members and each supporting a side margin of said belt in an upwardly and outwardly inclined manner,
   flexible barriers having lower portions in sliding contact with the margins of said belt to confine the granular material on said belt and
   barrier support means clamping said flexible barriers in an adjustable manner against surfaces of the bins to permit periodic downward repositioning of said barriers toward said belt to compensate for wear of the barriers,
   said barriers embodied in flexible strips, said barrier support means including quick release over center type clamps and plates biased by said clamps and clamping said barriers in place on said bin surfaces in a manner facilitating barrier repositioning relative to the endless belt.

2. The combination claimed in claim 1 additionally including a rotary vane feeder shaft in the bin carrying cement, drive means coupling said motor to said feeder shaft.

* * * * *